(12) United States Patent
Mabuchi (10) Patent No.: US 9,537,744 B2
(45) Date of Patent: Jan. 3, 2017

(54) COMMUNICATION SYSTEM AND COMMUNICATION METHOD

(71) Applicant: Mitsuhiro Mabuchi, Tokyo (JP)

(72) Inventor: Mitsuhiro Mabuchi, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 335 days.

(21) Appl. No.: 13/946,420

(22) Filed: Jul. 19, 2013

(65) Prior Publication Data

US 2014/0036693 A1 Feb. 6, 2014

(30) Foreign Application Priority Data

Jul. 27, 2012 (JP) ................................. 2012-166974

(51) Int. Cl.
*H04L 12/26* (2006.01)

(52) U.S. Cl.
CPC ........... *H04L 43/10* (2013.01); *H04L 43/0817* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2008/0304499 A1* | 12/2008 | Jeon | H04L 12/66 370/401 |
| 2011/0064126 A1* | 3/2011 | Ishiko | H04B 3/544 375/222 |
| 2012/0140861 A1* | 6/2012 | Menon | B60T 7/18 375/356 |

FOREIGN PATENT DOCUMENTS

| | | |
|---|---|---|
| JP | 2007-124602 | 5/2007 |
| JP | 2008-160574 | 7/2008 |
| JP | 2008-227591 | 9/2008 |
| JP | 2009-027358 | 2/2009 |
| JP | 2010-206697 | 9/2010 |
| JP | 2011-039702 | 2/2011 |

* cited by examiner

*Primary Examiner* — Chirag Shah
*Assistant Examiner* — Srinivasa Reddivalam
(74) *Attorney, Agent, or Firm* — Oblon, McClelland, Maier & Neustadt, L.L.P.

(57) ABSTRACT

A plurality of communication lines are connected to a gateway. The gateway relays a communication message between the communication lines. A communication message input to the gateway from a first communication line out of the communication lines is defined as a first communication message. The gateway generates a communication message for relay. The communication message for relay contains first path information and second path information incorporated into the first communication message. The first path information indicates the first communication line. The second path information indicates the fact that the first communication message has been input to the gateway. Further, the gateway transfers the communication message for relay to at least one communication line different from the first communication line. The communication device determines the reliability of the received communication message based on the first path information and the second path information in the received communication message.

11 Claims, 4 Drawing Sheets

COMMUNICATION SYSTEM AND COMMUNICATION METHOD

BACKGROUND OF THE DISCLOSURE

The present disclosure relates to a communication system including network-connected electronic control units mounted on a vehicle, for example. The present disclosure also relates to a communication method.

As is well known, in many cases, multiple electronic control units (ECUs) mounted on a vehicle are network-connected to each other to form a communication system that allows communication of information (vehicle information) held by these electronic control units. Specifically, such a communication system is configured as a vehicle network system using ECUs as communication devices. Examples of such a vehicle network system include a controller area network (CAN).

In a communication system composed of a CAN, a complicated system structure as a result for example of an increasing number of ECUs connected to the communication system tends to find difficulty in detecting or specifying an abnormality generated in the communication system or an unauthorized ECU connected to the communication system, for example. Thus, a technique of detecting an abnormality and the like generated in the communication system has conventionally been suggested, and an example of this technique is described in Japanese Laid-Open Patent Publication No. 2010-206697.

The communication system (vehicle-mounted communication network system) described in the publication is intended to detect an abnormal site in the network system. This communication system includes multiple buses connected to the system, a gateway to relay a communication message between the buses, one or more ECUs connected to each bus such that they can perform communication using a communication message, and an external diagnostic device connected to the gateway. In response to a connection confirmation request signal input from the external diagnostic device, the gateway outputs a response request signal to each ECU on each bus. In response to the received response request signal, each ECU outputs a response signal containing transmission source identifier data unique to the ECU itself to the bus to which this ECU is connected. Then, the gateway outputs to the external diagnostic device a result of comparison between this transmission source identifier data and transmission source identifier data in a response signal received for each bus or a value about each bus stored in advance, thereby specifying an ECU incapable of making communication.

In the CAN, ECUs sharing a bus, which is a communication line, can transmit messages onto the bus at their discretion, so that a message can be transmitted easily from each ECU to the bus. This makes it possible to transmit an unauthorized message to a bus in the CAN by connecting an unauthorized ECU to this bus, for example. Communication using such an unauthorized message should be prevented in real time. However, it is difficult to detect an abnormality in real time if it is to be detected in response to a connection request confirmation signal transmitted from the external diagnostic device, as in the aforementioned communication system in the Publication. Communication using an unauthorized message may be prevented by encrypting a communication message. However, performing encrypting process in real time involving a high processing load results in an increased load on an ECU, which is not negligible.

The aforementioned problems generally apply not only to the CAN but also to a communication system in which a communication message is transmitted and received to and from network-connected communication devices.

SUMMARY

It is an object of the present disclosure to provide a communication system and a communication method capable of maintaining the reliability of a communication message by performing a low-load and real-time process.

In accordance with one aspect of the present disclosure, a communication system is provided that includes at least one communication device and at least one gateway. The communication device is connected to communication lines and configured to perform communication using a communication message via the communication lines. The communication lines are connected to the gateway, and the gateway is configured to relay a communication message between the communication lines. A communication message input to the gateway from a first communication line out of the communication lines is defined as a first communication message. The gateway is configured to generate a communication message for relay. The communication message for relay contains first path information and second path information incorporated into the first communication message. The first path information indicates the first communication line, the second path information indicates the fact that the first communication message has been input to the gateway. The gateway is further configured to transfer the communication message for relay to at least one communication line different from the first communication line. The communication device is configured to determine the reliability of the received communication message based on the first path information and the second path information in the received communication message.

In accordance with another aspect of the present disclosure, a communication method for use in a communication system is provided. The communication system includes at least one communication device and at least one gateway. The communication device is connected to communication lines and makes communication using a communication message via the communication lines. The communication lines are connected to the gateway. The gateway relays a communication message between the communication lines. A communication message input to the gateway from a first communication line out of the communication lines is defined as a first communication message. The communication method includes: generating a communication message for relay via the gateway, the communication message for relay containing first path information and second path information incorporated into the first communication message, the first path information indicating the first communication line, the second path information indicating the fact that the first communication message has been input to the gateway; transferring the generated communication message for relay from the gateway to at least one communication line different from the first communication line; and making a communication device having received the communication message for relay determine the reliability of the received communication message based on the first path information and the second path information in the received communication message.

According to the aforementioned configuration or method, the reliability of a communication message is determined based on the first path information indicating the first communication line and the second path information indicating the fact that the first communication message has been input to the gateway. Specifically, the received communication message is verified based on a path along which this communication message has passed, so that the reliability of the received communication message is determined in real time. Making determination in real time allows the communication device to stop process of a communication message having passed a path other than a predetermined path, for example.

The reliability of a communication message is determined based on the first path information and the second path information merely indicating a communication path. Thus, the reliability of a communication message can be determined by a low-load process.

In accordance with one form of the communication system, communication line information corresponding to the first path information about each of the communication lines is defined for the communication device, and the communication device is configured to determine the reliability of the received communication message based on whether the first path information in the received communication message corresponds to the defined communication line information.

According to this configuration, the reliability of a communication message is determined based on whether the first path information corresponds to the communication line information defined for the communication device, and this correspondence is determined by comparing the first path information and the defined communication line information, for example. This reduces the load on data processing relating to the determination.

In accordance with one form of the communication system, gateway information corresponding to the second path information about the gateway is defined for the communication device, and the communication device is configured to determine the reliability of the received communication message based on whether the second path information in the received communication message corresponds to the defined gateway information.

According to this configuration, the reliability of a communication message can be determined based on process on the second path information and the gateway information that is performed for example by comparing the second path information and the defined gateway information. This reduces a load on data processing relating to the determination.

In accordance with one form of the disclosure, the communication message is configured as a protocol of a controller area network.

According to this configuration, low-load and real-time determination about the reliability of a communication message can be applied to a communication system employing the CAN protocol to be used in a vehicle-mounted network including an ECU functioning as a communication unit that in many cases has minimum necessary processing capability.

In accordance with one form of the disclosure, the gateway is configured to incorporate the first path information into a data field of a communication message defined by the protocol, and the communication device is configured to acquire the first path information from the data field of the communication message.

According to this configuration employing the CAN protocol, the first path information can be incorporated into a data field as a data area a user can set freely. Thus, process of incorporating the first path information into a communication message can be performed with a relatively high flexibility.

In accordance with one form of the disclosure, the gateway is configured to change a message ID of a communication message defined by the protocol to a message ID containing the second path information, and the communication device is configured to acquire the second path information from the message ID after the change in the communication message.

According to this configuration, the second path information can be acquired based on the message ID after the change. Thus, the reliability of a communication message can be determined easily by using the second path information. According to the CAN protocol, a message ID is processed in real time, so that the reliability of a communication message can be determined promptly by using the second path information.

In accordance with one form of the disclosure, the communication message has an extended format, and the message ID is a result of change of part of the message ID corresponding to an extended ID area defined by the extended format.

According to this configuration, part of a message ID corresponding to an extended ID is changed based on the second path information, whereas part of the message ID corresponding to a standard ID to be used according to a standard format is not changed. Thus, the reliability of a communication message can be determined based on the second path information and the like, while influence on a different communication message in the communication system is suppressed.

In accordance with one form of the disclosure, the gateway stores, as log data, information about a communication message input from the first communication line and the first path information, and the communication device stores, as log data, information about the received communication message, and the first path information and the second path information in the received communication message.

According to this configuration, relay and receipt of a communication message are stored as time-series data (log data). This allows evaluation of the reliability of a communication message, although this is ex post facto determination.

In accordance with one form of the disclosure, the communication system is configured to analyze the log data at regular intervals according to a predetermined rule. The communication system is further configured to replace the log data by a result obtained by the analysis.

According to this configuration, the contents of data stored as the log are rewritten according to a result of the analysis. This reduces the volume of data stored as the log. As a result, an ECU not having enough storage capacity can store log data.

In accordance with one form of the disclosure, the communication device is configured to acquire the log data stored in the gateway, and the communication device is further configured to evaluate the reliability of a communication message by comparing the acquired log data and the log data stored in the communication device.

According to this configuration, a path for a communication message can be verified based on the log data in the gateway and the log data in the communication device, so that the reliability of the communication message can be verified. As a result, the reliability of the communication message can be ensured at a higher level.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

FIGS. 1 to 7 show a communication system according to a first embodiment that embodies of the present disclosure.

Figure 1:
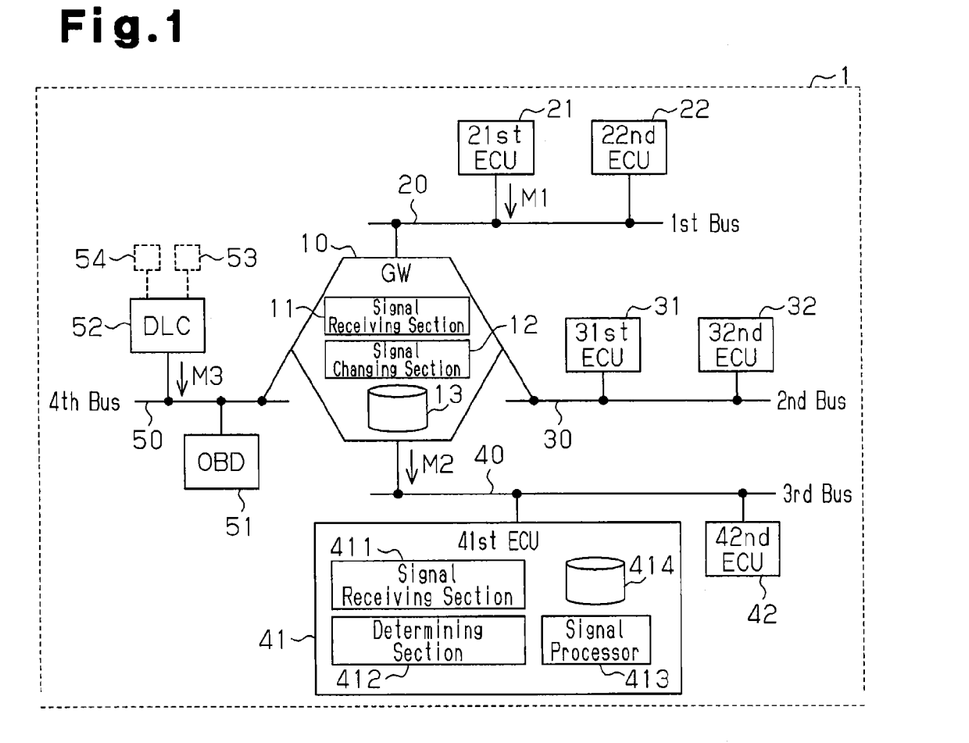
FIG. 1 is a block diagram schematically showing the configuration of a communication system according to a first embodiment of the present disclosure.

As shown in FIG. 1, a vehicle 1 includes a vehicle-mounted network system functioning as a communication system. Communication standards for the vehicle-mounted network system of this embodiment will be described first.

Figure 3:
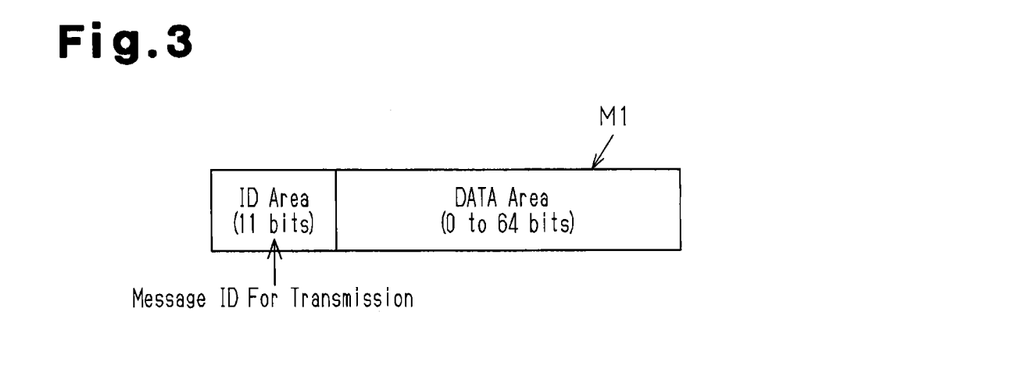
FIG. 3 is a diagrammatic view showing a data format of a communication message transmitted and received in the communication system of FIG. 1.

The vehicle-mounted network system is configured as a network to which a CAN (Controller Area Network) protocol is applied as a communication protocol. The CAN protocol realizes communication between communication devices by means of transmission and receipt of a communication message. The communication message is composed of frames each defined as one communication device by the CAN protocol. The CAN protocol defines multiple frames including a data frame used for data transfer. As shown in FIG. 3, for example, a data frame of a standard format includes an "ID area" of a size of 11 bits that is an area to store a "message ID" (CAN ID) used in identifying a communication message, and a "data area" (data field) of a size in a range of from 0 to 64 bits that is an area to store data to be transferred.

The configuration of the vehicle-mounted network system of this embodiment will now be described.

As shown in FIG. 1, the vehicle-mounted network system includes a first bus 20, a second bus 30, a third bus 40, and a fourth bus 50 as buses for communication functioning as communication lines, and a gateway (GW) 10 to which the first to fourth buses 20, 30, 40 and 50 are connected such that they can perform communication. The first to fourth buses 20, 30, 40 and 50 can convey a communication message according to the CAN protocol, and are twisted pair cables, for example.

Electronic control units (ECUs), which correspond to at least one communication device, are connected to each of the first to third buses 20, 30 and 40 such that each ECUs can communicate with other ECUs via the corresponding bus. More specifically, a twenty-first ECU 21 and a twenty-second ECU 22 are connected as communication devices to the first bus 20, a thirty-first ECU 31 and a thirty-second ECU 32 are connected as communication devices to the second bus 30, and a forty-first ECU 41 and a forty-second ECU 42 are connected as communication devices to the third bus 40. Thus, the twenty-first ECU 21 can transmit a communication message for transmission M1 to the first bus 20, and the forty-first ECU 41 can receive a communication message M2 from the third bus 40, for example. The twenty-first ECU 21 can receive a communication message, and the forty-first ECU 41 can transmit a communication message. According to the CAN protocol, multiple ECUs connected to the same bus can give and receive communication messages to and from each other via a bus to which these ECUs are connected.

An on-board diagnostic device (OBD) 51 is connected to the fourth bus 50 such that it can perform communication. Further, a data link connector (DLC) 52 is connected to the fourth bus 50. The data link connector 52 is a connector to connect an external device to the vehicle-mounted network system such that the external device can perform communication. As a result, an external device 53 or an external device 54 connected to the data link connector 52 can transmit a communication message M3 via the data link connector 52 to the fourth bus 50, for example. The external devices 53 and 54 can receive a communication message via the data link connector 52.

In this embodiment, the first bus 20 is a bus for a sensor system to which an ECU for a sensor system is to be connected, and the second bus 30 is a bus for a traveling system to which an ECU for a traveling system is to be connected. Further, the third bus 40 is a bus for a drive system to which an ECU for a drive system is to be connected, and the fourth bus 50 is a bus for a system of an information device to which an ECU for a system of an information device, a diagnostic device, or an external device is to be connected, for example.

The gateway (GW) 10 is a device to output a communication message input from one bus to a different bus, specifically, to relay a communication message between buses. More specifically, the gateway 10 receives a communication message from the first, second, third or fourth bus 20, 30, 40 or 50 connected to the gateway 10, and transfers the received communication message to a bus other than the bus from which the communication message has been input. As an example, the gateway 10 can receive the communication message for transmission M1 input from the first bus 20 and transmit the received communication message for transmission M1 as the communication message for relay M2 to each of the second to fourth buses 30, 40 and 50. The communication message for relay M2 of this case is a communication message corresponding to the communication message for transmission M1, and is a communication message after being subjected to necessary process by the gateway 10. The communication message for relay M2 may be the same as the communication message for transmission M1.

As described above, the gateway 10 transfers communication messages between different buses. Thus, even if multiple ECUs are connected to different buses, these ECUs can transmit and receive, namely, give and receive communication messages to and from each other.

The twenty-first to forty-second ECUs 21 to 42 are each a control device used for various controls of the vehicle 1, and is an ECU to control a control target, which is, for example, a drive system, a traveling system, a sensor system, or a system of an information device. Examples of an ECU to control a target of a drive system include an engine ECU. Examples of an ECU to control a target of a traveling system include a steering ECU and a brake ECU. Examples of an ECU to control a target of a sensor system include ECUs to which sensors such as a temperature sensor and a speed sensor are connected. Examples of an ECU to control a target of a system of an information unit include a car navigation ECU.

In this embodiment, the twenty-first and twenty-second ECUs 21 and 22 are ECUs for a sensor system, and are connected to the first bus 20 for a sensor system. The thirty-first and thirty-second ECUs 31 and 32 are ECUs for a traveling system, and are connected to the second bus 30 for a traveling system. The forty-first and forty-second ECUs 41 and 42 are ECUs for a drive system, and are connected to the third bus 40 for a drive system. The twenty-first to forty-second ECUs 21 to 42 have the same structure. In the below, the structure of the forty-first ECU 41 will be described, and those of the other ECUs 21 to 32 and 42 will not be described.

The on-board diagnostic device 51 is a diagnostic device to make a diagnosis of a vehicle condition, for example. The on-board diagnostic device 51 is mounted as a genuine communication device on the vehicle 1 by a manufacturer, for example.

The data link connector 52 is a connection terminal that can connect the external devices 53 and 54 to the fourth bus 50 such that the external devices 53 and 54 can perform communication. The genuine communication device 53 prepared for example by a manufacturer or a car dealer can be connected to the data link connector 52. Examples of the genuine communication device 53 include an external diagnostic device and a device to update software. The third-party communication device 54 prepared by a user can also be connected to the data link connector 52. Examples of the third-party communication device 54 include a third-party tester and a smartphone (multi-functional communication device). The on-board diagnostic device 51 and the data link connector 52 are connected to the fourth bus 50 that is a bus for a system of an information device.

A communication message output to a bus from the third-party communication device 54 may exert influence, particularly adverse influence on the vehicle-mounted network system, and this influence may not be examined sufficiently. Referring particularly to a smartphone, a user can freely download application software such as one for speed indication from the Internet onto the smartphone and execute the software, and this application software communicates with the vehicle-mounted network system. This application software may transmit a communication message not complying with the CAN protocol, a communication message that will disadvantageously affect communication, or a communication message by a malicious function, for example, leading to adverse influence on the vehicle-mounted network system.

Figure 2:
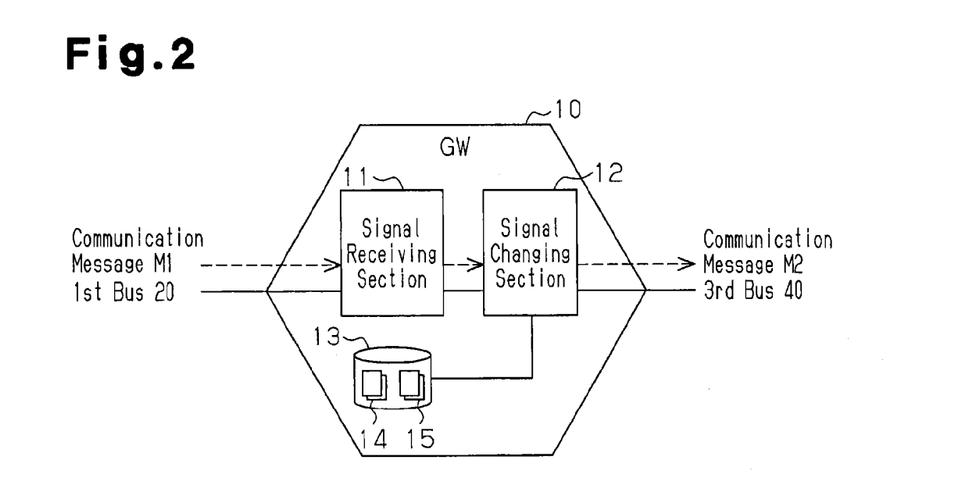
FIG. 2 is a block diagram schematically showing the configuration of the gateway shown in FIG. 1.

As shown in FIG. 2, the gateway 10 includes a signal receiving section 11 connected to the first to fourth buses 20, 30, 40 and 50 (only the first bus 20 is shown in FIG. 2), and a signal changing section 12 to generate the communication message for relay M2 by performing certain process on the communication message for transmission M1 input from the signal receiving section 11 connected to the signal changing section 12 and to output (transfer) the generated communication message for relay M2 to a bus. The gateway 10 also includes a storage 13 storing information of various types used by the signal changing section 12 in generating the communication message for relay M2.

The storage 13 stores bus information 14 as multiple pieces of first path information each corresponding to the first to fourth buses 20, 30, 40 and 50, and a message ID for relay 15 as multiple pieces of second path information corresponding to a message ID for transmission assigned by the twenty-first ECU 21 to the input communication message for transmission M1 (see FIG. 3).

All pieces of the bus information 14 are defined as values different from each other. If expressed as binary numbers, "00," "01," "10" and "11" are defined as respective pieces of bus information about the first to fourth buses 20, 30, 40 and 50.

The message ID for relay 15 is a message ID associated with a message ID assigned to the communication message for transmission M1. The message ID for relay 15 is a value defined uniquely to the gateway 10 so that a gateway having relayed a message can be identified based on the value (ID) of the message ID for relay 15. In the presence of a different gateway, for example, a value different from the message ID for relay 15 for the gateway 10 is defined for this different gateway. As an example, two values "0x021" and "0x022" (see FIGS. 5(b) and 5(c)) are defined for the gateway 10 as the message ID for relay 15 corresponding to a message ID for transmission "0x020" (see FIG. 5(a)) assigned by the twenty-first ECU 21 to the communication message for transmission M1. The message ID "0x021" being part of the message ID for relay 15 is a message ID to be assigned to the communication message for relay M2 if an ECU having received this message ID is requested to determine the reliability of a communication message based on the appropriateness of a bus path. Whereas, the message ID "0x022" being part of the message ID for relay 15 is a message ID to be assigned to the communication message for relay M2 if an ECU having received this message ID is not requested to determine the reliability of a communication message based on the appropriateness of a bus path. The gateway 10 switches the message ID for relay 15 to indicate if an ECU should determine the reliability of a communication message. Thus, the gateway 10 can indicate if an ECU should make determination about the appropriateness of a bus path that involves a load of some extent on the ECU, specifically, the gateway 10 can control a load on the ECU.

The signal receiving section 11 determines the bus from which a received communication message has been input. As an example, if the communication message for transmission M1 transmitted from the twenty-first ECU 21 has been input to the gateway 10 via the first bus 20, the signal receiving section 11 detects the first bus 20 as a source from which the communication message for transmission M1 has been input. Then, the signal receiving section 11 transmits, together with the communication message for transmission M1, a result of this detection about a bus having input the communication message for transmission M1.

The signal changing section 12 performs certain process on the received communication message for transmission M1. The certain process includes process of incorporating bus information into the received communication message for transmission M1 and process of incorporating gateway information into the received communication message for transmission M1. Regarding the process of incorporating bus information, bus information 14 corresponding to a result of detection about a bus having been transmitted from the signal receiving section 11 is selected, and the communication message for relay M2 is generated based on the selected bus information 14 and the communication message for transmission M1 for transmission. Regarding the process of incorporating gateway information, a message ID for relay 15 corresponding to a message ID of the communication message for transmission M1 is selected. Then, the selected message for relay ID 15 takes the place of the message ID of the communication message for transmission M1 to become a message ID of the communication message for relay M2, specifically, a message ID of a communication message for relay M2a, M2b or M2c.

Figure 4:
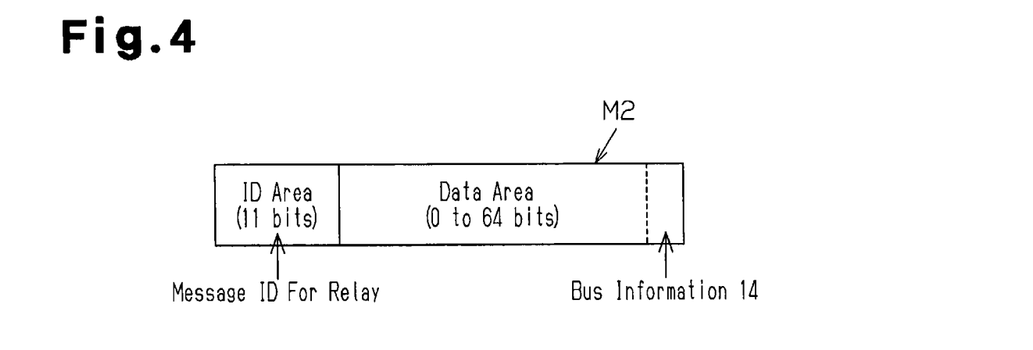
FIG. 4 is a diagrammatic view showing bus information incorporated into the communication message of FIG. 3.

As shown in FIG. 4, in the process of incorporating bus information, the signal changing section 12 writes the selected bus information 14 into the last two bits of the "data area" of the communication message for transmission M1. As an example, the communication message for transmission M1 has been input from the first bus 20, so that "00" is written into the last two bits of the "data area" of the communication message for transmission M1. Specifically, the signal changing section 12 changes the received communication message for transmission M1 to the communication message for relay M2 containing the bus information 14.

Figures 5A, 5B, 5C:
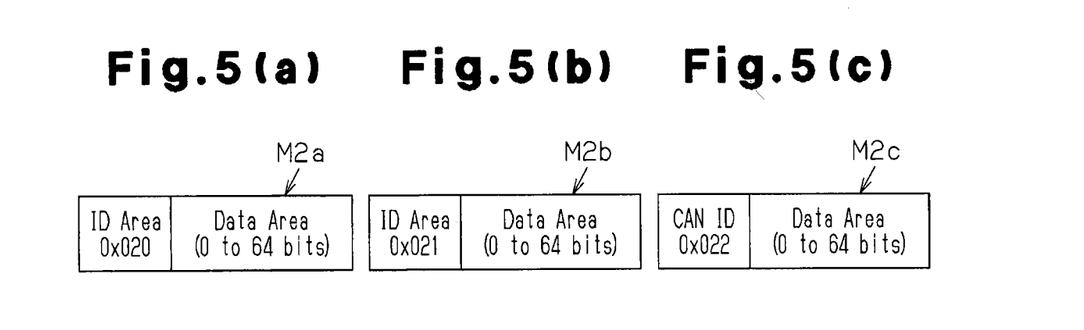
FIG. 5(a) is a diagrammatic view showing a message ID contained in the communication message of FIG. 4, where the message ID in the communication message of FIG. 4 is for transmission added by an ECU.
FIGS. 5(b) and 5(c) are diagrammatic views each showing a message ID for relay added to the communication message of FIG. 4 by the gateway.

As shown in FIGS. 5(a) to 5(c), in the process of incorporating gateway information, the signal changing section 12 changes a message ID of the communication message for relay M2 to the selected message ID for relay 15. As an example, the message ID "0x020" of the communication message for transmission M1 is replaced by a message ID for relay that is either "0x021" or "0x022". Specifically, the signal changing section 12 generates one of the following communication messages as the communication message for relay M2 containing the bus information 14: the communication message for relay M2a with the message ID "0x020" remaining unchanged; the communication message for relay M2b with a message ID changed to "0x021"; and the communication message for relay M2c with a message ID changed to "0x022".

The process of incorporating gateway information of this embodiment is defined such that the message ID "0x020" of the communication message for transmission M1 is changed to the message ID for relay "0x021" indicating that an ECU having received this message ID should determine the appropriateness of a bus path.

Figure 6:
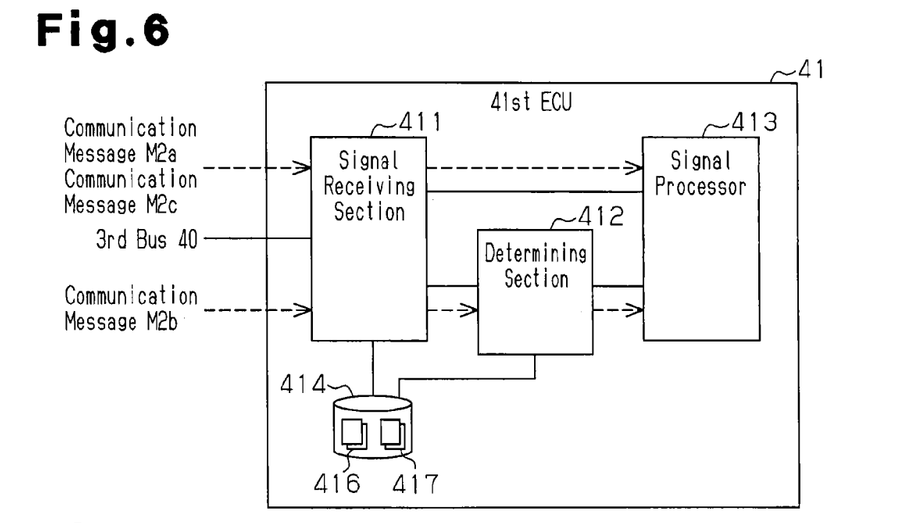
FIG. 6 is a block diagram schematically showing the configuration of an ECU shown in FIG. 1.

As shown in FIG. 6, the forty-first ECU 41 includes a signal receiving section 411 connected to the third bus 40 and a determining section 412 connected to the signal receiving section 411. The signal receiving section 411 receives the communication message for relay M2 input from the third bus 40. The determining section 412 determines the appropriateness of a bus path about a communication message transmitted from the signal receiving section 411. The forty-first ECU 41 further includes a signal processor 413 connected to the signal receiving section 411 and the determining section 412, and a storage 414. The signal processor 413 processes data in a received communication message. The storage 414 stores information such as that required in determining the reliability of a communication message.

The signal processor 413 is composed of a microcomputer including an arithmetic unit to perform various processes, and a storage storing results of arithmetic operations, programs to provide various control functions, and the like. In the signal processor 413, a program to provide predetermined control function is executed by the arithmetic unit, thereby providing this control function. Thus, the signal processor 413 reads a control program in the storage into the arithmetic unit and executes the program, thereby providing a control target with the function of this program to control the target. According to the program, data obtained from the communication message for relay M2 transmitted from a different ECU is processed, or a communication message for transmission is generated based on data obtained as a result of various processes, and then transmitted to the third bus 40.

Communication line information 416 corresponding to, among the respective pieces of the bus information 14 about the first to fourth buses 20, 30, 40 and 50, bus information 14 from which the communication message M2 can be input to the forty-first ECU 41 is defined for the storage 414. As an example, a value "00" (binary number) corresponding to the first bus 20 and a value "01" (binary number) corresponding to the second bus 30 are defined as the communication line information 416 for the storage 414. Gateway information 417 corresponding to a message ID of a communication message the forty-first ECU 41 should receive is defined for the storage 414. As an example, "0x020" as a message ID for transmission, and "0x021" and "0x022" in the message ID for relay 15 are defined as the gateway information 417.

The signal receiving section 411 is a section to receive the communication message for relay M2 and the like flowing in the third bus 40 and corresponds to a receiving function of what is called a CAN controller. A transmitting function of the CAN controller is not shown in the drawings. Based on whether the gateway information 417 contains a message ID of the communication message for relay M2, the signal receiving section 411 determines whether "the communication message for relay M2 is necessary for the forty-first ECU 41." If it is determined that the "communication message for relay M2 is necessary for the forty-first ECU 41," the signal receiving section 411 acquires the communication message for relay M2. If it is determined that the "communication message for relay M2 is not necessary for the forty-first ECU 41," the signal receiving section 411 disposes of the received communication message for relay M2 and the like without acquiring the same.

In this embodiment, it is determined whether the appropriateness of a bus path is to be determined or not based on a message ID of the communication message for relay M2. If the message ID for relay 15 is "0x021," specifically if a communication message for relay is M2b, the signal receiving section 411 determines that "the appropriateness of a bus path should be determined." Then, the signal receiving section 411 transmits the communication message for relay M2b to the determining section 412. If the message ID for relay 15 is "0x022," specifically if a communication message for relay is M2c, the signal receiving section 411 determines that "the appropriateness of a bus path is not required to be determined." Then, the signal receiving section 411 transmits the communication message for relay M2 to the signal processor 413. If a message ID is "0x020," specifically if a communication message for relay is M2a, the signal receiving section 411 determines that "the appropriateness of a bus path is not to be determined." Then, the signal receiving section 411 transmits the communication message for relay M2 and the like to the signal processor 413. If a message ID of the communication message for relay M2 is that of the communication message for relay M2a, this communication message for relay M2 has been not relayed by the gateway 10. Thus, the signal receiving section 411 can dispose of the communication message for relay M2a for the reason that its "communication path is inappropriate."

As described above, based on the message ID for relay 15, the signal receiving section 411 determines whether the communication message for relay M2 is to be acquired. The message ID for relay 15 is a message ID assigned to a communication message having been relayed by the gateway 10. Thus, the signal receiving section 411 confirms that "the communication message for relay M2 has been relayed by the gateway 10 during its communication path." Specifically, based on whether the communication message for relay M2 has been relayed by the gateway 10, the signal receiving section 411 can determine the reliability of the communication message for relay M2.

The signal receiving section 411 determines the necessity of receipt based on a message ID. Generally, the CAN controller processes a message ID used for arbitration of a communication message promptly in real time by filtering, for example. By taking advantage of such process on a message ID performed promptly in real time, the reliability of a communication message can be determined and the necessity of determination about the appropriateness of a bus path can be determined promptly in real time. The arbitration conducted by the CAN controller does not place a load on a signal processor of an ECU or places a low load even if a load is generated. Thus, using a message ID for determination about the reliability of a communication message and the like can reduce a load on an ECU. Specifically, the signal receiving section 411 can determine the presence or absence of a relay by the gateway 10 about the message ID for relay 15 and determine the necessity of determination about the appropriateness of a bus path about the message ID for relay 15 in real time and promptly in a low-load condition.

If only the communication message for relay M2b is transmitted from the signal receiving section 411, the determining section 412 determines the reliability of the transmitted communication message for relay M2b based on the bus information 14 in this communication message for relay M2b. By acquiring the last two bits of the "data area" of the communication message for relay M2, the determining section 412 determines whether the communication line information 416 contains the value of the acquired two bits. It is assumed for example that the forty-first ECU 41 accepts input of a communication message transmitted from the first or second bus 20 or 30, and does not accept input of a communication message (M3) transmitted from the fourth bus 50. In this case, if the bus information 14 to be referred to as the communication line information 416 is "00" or "01," the determining section 412 transmits the communication message M2b to the signal processor 413. If the bus information 14 to be referred to as the communication line information 416 is "10" or "11," the determining section 412 disposes of the communication message M2b and dose not transmit the same to the signal processor 413.

As an example, the communication message for transmission M3 input from the external device 53 or 54 to the gateway 10 via the fourth bus 50 is assigned with "11" as the bus information 14. Hence, the communication message for relay M2 corresponding to the communication message for transmission M3 is disposed of, even if it is transmitted from the signal receiving section 411 to the determining section 412. Thus, even if a communication message that is to be transmitted originally from the first bus 20 is transmitted via the fourth bus 50 from an unauthorized device, for example, this communication message is disposed of by the determining section 412. As a result, such a communication message is not processed by the signal processor 413.

The value "10" of the bus information 14 corresponds to the value of the third bus 40. Generally, a communication message is not relayed by the gateway 10 again to the third bus 40 after it flows in the third bus 40, to which the forty-first ECU 41 is connected. Thus, if a communication message contains the value "10" of the bus information 14 about the third bus 40, to which the forty-first ECU 41 itself is connected, the forty-first ECU 41 determines that "a communication path for this communication message is inappropriate."

Figure 7:
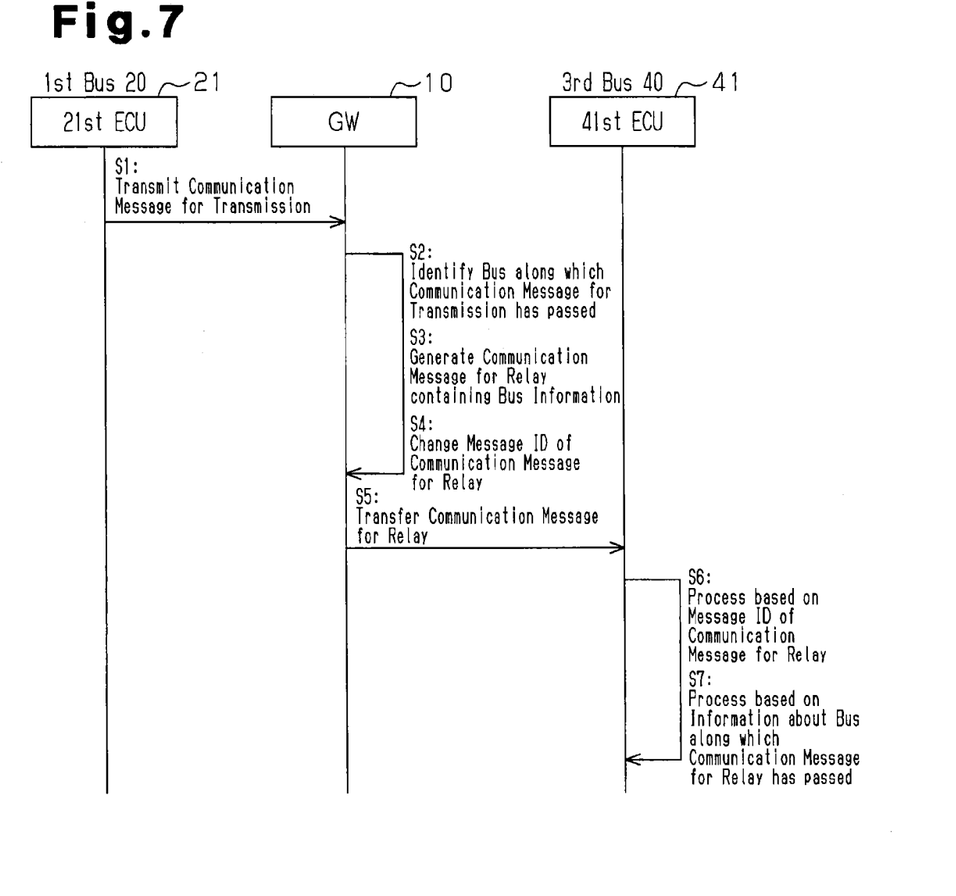
FIG. 7 is a sequence diagram showing procedure of processing a communication message in the communication system of FIG. 1.

FIG. 7 shows an operation of this embodiment.

As shown in FIG. 7, the twenty-first ECU 21 connected to the first bus 20 transmits the communication message for transmission M1 (step S1). The communication message for transmission M1 from the twenty-first ECU 21 is input via the first bus 20 to the gateway 10 connected to the first bus 20.

The signal receiving section 11 of the gateway 10 detects (identifies) the "first bus 20" as a source from which the communication message for transmission M1 has been input (step S2). Based on a result of this detection obtained by the signal receiving section 11 and the communication message for transmission M1, the signal changing section 12 of the gateway 10 generates the communication message for relay M2 containing the value "00" of the bus information 14 (step S3). Further, the signal changing section 12 of the gateway 10 selects the value "0x021" of the message ID for relay 15 corresponding to the value "0x020" of a message ID of the communication message for transmission M1, and replaces a message ID of the communication message for relay M2 with the selected message ID for relay 15. As a result, the communication message for relay M2b is generated, for example (step S4). The gateway 10 relays the resultant communication message for relay M2b. More specifically, the gateway 10 outputs, namely transmits the communication message for relay M2b to the third bus 40, for example (step S5).

The forty-first ECU 41 receives the communication message for relay M2b having been transmitted to the third bus 40. After receiving the communication message for relay M2b, the forty-first ECU 41 makes the signal receiving section 411 confirm that the communication message for relay M2b has been relayed by the gateway 10 based on the value "0x021" of the message ID of the communication message for relay M2b, thereby determining the reliability of the communication message for relay M2b. The forty-first ECU 41 further determines whether the appropriateness of a bus path is to be determined (step S6).

The message ID of the communication message for relay M2b of this case has the value "0x021". Thus, the forty-first ECU 41 determines the reliability of the communication message for relay M2b based on the appropriateness of a bus path. For this determination, the forty-first ECU 41 transmits the communication message for relay M2*b* to the determining section 412. After receiving the communication message for relay M2*b*, the determining section 412 acquires the bus information 14 from the "data area" of this communication message M2*b* to determine whether the acquired bus information 14 is either the value "00" or "01" of the communication line information 416. If the bus information 14 is either the value "00" or "01" of the communication line information 416, the determining section 412 determines that "a bus path for the communication message for relay M2*b* is appropriate." Then, the determining section 412 transmits this communication message for relay M2*b* to the signal processor 413 (step S7). As a result, the bus from which the communication message for relay M2*b* has been input to the gateway 10 is confirmed, and based on the fact that the communication message for relay M2*b* has passed the path from which it has been input to the gateway 10, the reliability of the communication message for relay M2*b* is ensured. Data and the like about the highly-reliable communication message for relay M2*b* is processed by the signal processor 413.

If the bus information 14 is a value other than the value "00" or "01," the determining section 412 determines that "a bus path for the communication message for relay M2*b* is not appropriate." As a result, the determining section 412 disposes of this communication message for relay M2*b* without transmitting the same to the signal processor 413. As a result, less reliable communication message for relay M2*b* is processed by the signal processor 413. This prevents generation of a feeling of discomfort, inconvenience or the like of the action of the vehicle 1, for example.

If a communication message for relay is M2*c* having a message ID "0x022," for example, the forty-first ECU 41 is not required to determine the reliability of the communication message for relay M2*c* based on the appropriateness of a bus path. Thus, the communication message for relay M2*c* is transmitted to the signal processor 413. According to the number of times the communication messages for relay M2*b* and M2*c* are generated and intervals of time when these messages are generated, for example, the forty-first ECU 41 switches the two communication messages for relay M2*b* and M2*c* generated by the gateway 10 based on the communication message for transmission M1. This reduces load on the forty-first ECU 41 to be placed by making determination based on the appropriateness of a bus path.

The communication system of this embodiment achieves the advantages as follows.

(1) The forty-first ECU 41 determines the reliability of the communication message for relay M2 based on the bus information 14 (first path information) indicating the bus from which the communication message for relay M2 has been input to the gateway 10 and the message ID for relay 15 (second path information) indicating that the communication message for relay M2 has been input to the gateway 10. Specifically, the forty-first ECU 41 verifies the received communication message for relay M2 based on a path along which the communication message for relay M2 has passed. Thus, the forty-first ECU 41 determines the reliability of the received communication message for relay M2 in real time. Making determination in real time allows the forty-first ECU 41 to stop process of the communication message for relay M2 having passed a path other than a predetermined path, for example.

The forty-first ECU 41 can determine the reliability of the communication message for relay M2 based on the bus information 14 and the message ID for relay 15 merely indicating a communication path. Thus, the reliability of the communication message for relay M2 can be determined by a low-load process.

(2) Based on a comparison between the bus information 14 and the communication line information 416, it is determined whether the bus information 14 corresponds to the communication line information 416 defined for the forty-first ECU 41, thereby determining the reliability of a communication message for relay. This reduces load on data processing relating to the determination.

(3) The reliability of the communication message for relay M2 can be determined based on a process of comparing the message ID for relay 15 and the gateway information 417, so that load on data processing relating to the determination is reduced.

(4) Low-load and real-time determination about the reliability of the communication message for relay M2 can be applied to a communication system employing the CAN protocol to be used in a vehicle-mounted network including the forty-first ECU 41 functioning as a communication device that in many cases has minimum necessary processing capability.

(5) According to the CAN protocol, the bus information 14 can be incorporated into a data field as a "data area" a user can set freely. Thus, process of incorporating the bus information 14 into a communication message can be performed with a relatively high flexibility.

(6) The message ID for relay 15 can be acquired based on a message ID changed so as to correspond to a message ID for communication. Thus, the reliability of the communication message for relay M2 can be determined easily by using the message ID for relay 15. According to the CAN protocol, a message ID is processed in real time, so that the reliability of the communication message for relay M2 can be determined promptly by using the message ID for relay 15.

Second Embodiment

Figure 8:
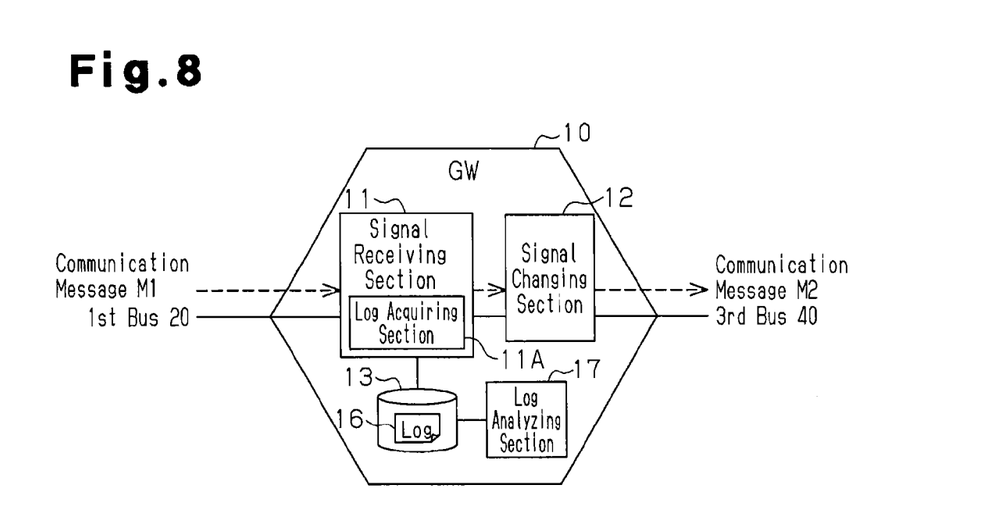
FIG. 8 is a block diagram schematically showing the configuration of a gateway of a communication system according to a second embodiment of the present disclosure.
Figure 9:
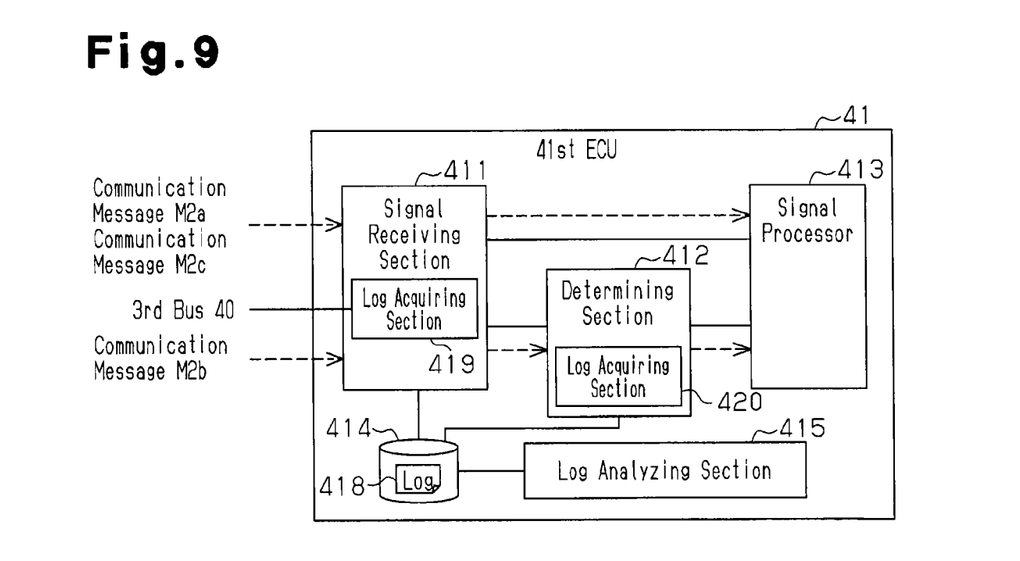
FIG. 9 is a block diagram schematically showing the configuration of an ECU to transmit and receive a communication message to and from the gateway of FIG. 8.

FIGS. 8 and 9 show a communication system of the present disclosure.

The structure of this embodiment differs from that of the first embodiment in that the gateway 10 and the forty-first ECU 41 each include a structure to acquire log data about a communication message. The structure of this embodiment is the same in other respects as that of the first embodiment. The following description is mainly intended for differences from the first embodiment. Corresponding structures are identified by the same reference numbers and will not be described in detail.

As shown in FIG. 8, the gateway 10 includes a log acquiring section 11A provided in the signal receiving section 11. The log acquiring section 11A of the signal receiving section 11 associates the communication message for transmission M1 and a result of detection about the bus from which the communication message for transmission M1 has been input, thereby storing resultant time-series data as a log 16 (log data) in the storage 13. Instead of the communication message for transmission M1, the log acquiring section 11A may associate information about the communication message for transmission M1 capable of specifying the fact that the communication message for transmission M1 has been input with a result of detection about a bus from which the communication message for transmission M1 has been input, thereby storing resultant data as the log 16 in the storage 13.

A log analyzing section 17 analyzes the log 16 in the storage 13 at regular intervals and reduces the data volume of the log 16 in the storage 13 according to a result of the analysis. As an example, if the log 16 stored in the storage 13 reaches a predetermined volume or has been stored in the storage 13 for more than a predetermined period of time, the log analyzing section 17 analyzes data about the log 16, stores a result of the analysis as the log 16 in the storage 13, and deletes the analyzed data. This reduces the data volume of the log 16 stored in the storage 13. Regarding analysis of log data, log data segments of the same type are compiled, only the latest one of log data segments of the same type remains undeleted, or normal log data is deleted.

As described, the log 16 contains information about the communication message for transmission M1 input to the signal receiving section 11 and information about the bus from which the communication message for transmission M1 has been input. This allows verification of the reliability of the communication message for transmission M1, although this is ex-post verification. Further, it is possible to prevent deletion of data without being analyzed.

As shown in FIG. 9, the forty-first ECU 41 includes a log acquiring section 419 provided in the signal receiving section 411. The log acquiring section 419 of the signal receiving section 411 stores the communication message for relay M2 and the message ID for relay 15 as a log 418 (log data) being time-series data in the storage 414. Instead of the communication message for relay M2, the log acquiring section 419 may store in the storage 414 information as the log 418 about the communication message for relay M2 capable of specifying the fact that the communication message for relay M2 has been input.

The forty-first ECU 41 includes a log acquiring section 420 provided in the determining section 412. The log acquiring section 420 of the determining section 412 associates the communication message for relay M2 (M2b) and the bus information 14 in the "data area," thereby storing resultant time-series data as the log 418 (log data) in the storage 414. Specifically, the log acquiring section 420 associates the bus information 14 with data about the communication message for relay M2 (M2b) already stored as the log 418, thereby storing the bus information 14.

A log analyzing section 415 analyzes the log 418 in the storage 414 at regular intervals and reduces the data volume of the log 418 in the storage 414 according to a result of the analysis. As an example, if the log 418 stored in the storage 414 reaches a predetermined volume or has been stored in the storage 414 for more than a predetermined period of time, the log analyzing section 415 analyzes data about the log 418, stores a result of the analysis as the log 418 in the storage 414, and deletes the analyzed log data. This reduces the data volume of the log 418 stored in the storage 414. Regarding analysis of log data, log data segments of the same type are compiled, only the latest one of log data segments of the same type remains undeleted, or normal log data is deleted.

As described, the log 418 contains information about the communication message for relay M2 input to the signal receiving section 411 and the bus information 14. This allows verification of the reliability of the communication message for relay M2, although this is ex-post verification. Further, generation of unanalyzed data deleted erroneously can be prevented.

The log analyzing section 415 acquires the log 16 from the gateway 10 and compares the log 16 with the log 418 in the forty-first ECU 41. Thus, the log analyzing section 415 can determine that the communication message for relay M2 has been relayed by the gateway 10, although this is ex-post determination. As a result, the reliability of the communication message for relay M2 can be verified (evaluated) in a more favorable manner.

As described above, the communication system of this embodiment achieves the following advantages in addition to the aforementioned advantages of the first embodiment.

(7) Relay of the communication message for transmission M1 and receipt of the communication message for relay M2 are stored as time-series data (log data) in the logs 16 and 418 respectively. This allows evaluation of the reliability of a communication message, although this is ex-post determination.

(8) The contents of data stored as the logs 16 and 418 are rewritten according to a result of analysis. This reduces the volumes of data stored as the logs 16 and 418. As a result, an ECU not having enough storage capacity can store log data.

(9) A path for the communication message for relay M2 can be verified based on the log 16 (log data) in the gateway 10 and the log 418 (log data) in the forty-first ECU 41, so that the reliability of the communication message for relay M2 can be verified. As a result, the reliability of the communication message for relay M2 is ensured at a higher level.

Other Embodiments

Each of the aforementioned embodiments may be modified as follows.

According to each of the aforementioned embodiments, a data frame has a standard format with an "ID area" and a "data area." However, the present invention is not limited to this, but the data frame may have an extended format further including an "extended ID area."

Figure 10:
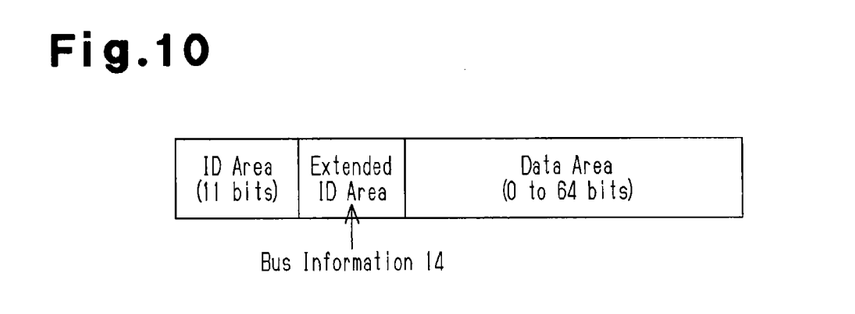
FIG. 10 is a diagrammatic view showing a data format of a communication message in a communication system according to another embodiment of the present disclosure.

As shown in FIG. 10, if the data frame has the extended format, bus information may be incorporated into the "extended ID area." Incorporating the bus information in the "extended ID area" can prevent use of part of the "data area" for the bus information, specifically, prevent reduction of data capable of being stored in the "data area." The "extended ID area" has a size of 18 bits, so that a large number of buses can be identified.

Part of a message ID corresponding to an extended ID is changed based on a message ID for relay, whereas part of the message ID corresponding to a standard ID to be used according to the standard format is not changed. Thus, the reliability of a communication message for relay can be determined based on the message ID for relay, while influence on a different communication message in the communication system is suppressed. As a result, the design flexibility of the communication system is improved.

According to each of the aforementioned embodiments, the four buses, which are the first to fourth buses 20, 30, 40 and 50, are provided. However, the present invention is not limited to this. As long as multiple buses are provided in the communication system, the number of the buses may be three or less, or five or more. This enhances applicability of the communication system.

According to each of the aforementioned embodiments, the first bus 20 is a bus for a sensor system, the second bus 30 is a bus for a traveling system, the third bus 40 is a bus for a drive system, and the fourth bus 50 is a bus for a system of an information device. However, the present invention is not limited to this. A different combination of the systems (types) of ECUs and the like connected to corresponding buses is applicable. Alternatively, different systems (types) of ECUs and the like may be connected to one bus. As a result, an increased flexibility can be expected in the structure of the communication system.

According to each of the aforementioned embodiments, two devices such as ECUs are connected to each of the first to fourth buses 20, 30, 40 and 50. However, the present invention is not limited to this. The number of devices such as ECUs to be connected to a bus may be any number that conforms to the standards for the CAN protocol. One device, or three or more devices can be connected. This improves the flexibility in the configuration of the communication system.

According to each of the aforementioned embodiments, the twenty-first to forty-second ECUs 21 to 42 have the same structure. However, the present invention is not limited to this. In order to ensure the reliability of a communication message, only an ECU to receive the target communication message may include a signal receiving section and a determining section that can ensure the reliability of the communication message. As a result, the communication system can be applied to a conventional system, which enhances applicability of this communication system.

According to each of the aforementioned embodiments, the communication message for transmission M1 is output from the twenty-first ECU 21. However, the present invention is not limited to this. An ECU to output a communication message for transmission is not specifically limited. According to each of the aforementioned embodiments, the communication message for relay M2 is received by the forty-first ECU 41. However, the present invention is not limited to this. An ECU to receive a communication message for relay is not specifically limited either. This increases the flexibility in the structure of the communication system, and improves the applicability of the communication system.

According to each of the aforementioned embodiments, the communication message for transmission M1 input from the first bus 20 is relayed by the gateway 10 to each of the second to fourth buses 30, 40 and 50. However, the present invention is not limited to this. As long as a communication message for transmission can be relayed to a bus required to receive the message, the gateway can relay the communication message for transmission to a specific bus. This can increase the flexibility in the structure of the communication system.

According to each of the aforementioned embodiments, the gateway 10 performs a process of incorporating bus information and a process of incorporating gateway information sequentially in this order. However, the present invention is not limited to this. The order in which these processes are performed is not limited as long as it can generate a communication message for relay. As an example, the process of incorporating bus information can be performed after the process of incorporating gateway information. This improves the design flexibility of the communication system.

According to each of the aforementioned embodiments, the bus information 14 and the communication line information 416 are numerical numbers expressed as binary numbers. However, the present invention is not limited to this. Bus information and communication line information may be expressed as decimal numbers other than binary numbers, or they may contain characters or symbols. In this case, a "data area" and the like to store the bus information may have a size reserved to conform to the size of the bus information. This improves the design flexibility of the communication system.

According to each of the aforementioned embodiments, the bus information 14 is numerical value expressed as a binary number, and the message ID for relay 15 is expressed as a message ID. However, the present invention is not limited to this. One set value to be used in determining the reliability of a communication message may be defined based on bus information and a message ID for relay. This set value may be a message ID. As an example, if the communication system is composed of four buses and one gateway, the set value can be expressed as four message IDs for relay composed of combinations of these four buses and one message ID for relay. If the set value is to further indicate the presence or absence of appropriateness of a bus path, this set value can be expressed as eight message IDs. This can also determine the reliability of a communication message by using a message ID to be processed promptly, which improves the design flexibility of the communication system.

According to each of the aforementioned embodiments, the value of a message ID for transmission and that of the message ID for relay 15 are serial numbers. However, the present invention is not limited to this. As long as a selectable message ID for relay 15 corresponds to a message ID for transmission, the value of the message ID for transmission and that of the message ID for relay 15 are not always required to be serial numbers. As a result, enhanced design flexibility of the communication system can be expected.

According to each of the aforementioned embodiments, multiple pieces of the bus information 14 and multiple message IDs for relay 15 are stored in the storage 13, and multiple pieces of the communication line information 416 and multiple pieces of the gateway information 417 are stored in the storage 414. However, the present invention is not limited to this. As an example, multiple pieces of bus information or multiple message IDs for relay may be managed in a list, table or database, the number of such lists, tables or databases being smaller than the number of the pieces of the bus information or that of the message IDs for relay, such as one. Likewise, multiple pieces of communication line information and multiple pieces of gateway information may be managed in a list, table or database, the number of such lists, tables or databases being smaller than the number of the pieces of the communication line information or that of the pieces of the gateway information, such as one. This increases the flexibility in information management, and improves design flexibility of the communication system.

According to each of the aforementioned embodiments, two values of the message ID for relay 15 correspond to the value of a message ID for transmission. However, the present invention is not limited to this. One value of the message ID for relay may correspond to the value of the message ID for transmission. This makes it possible to confirm that a communication message has been relayed by a gateway. Three or more values of the message ID for relay may correspond to the value of the message ID for transmission. In this case, a message ID for relay to be assigned to a communication message for relay can be switched among these values. This improves the enhanced design flexibility of the communication system.

According to each of the aforementioned embodiments, the signal receiving section 411 of the forty-first ECU 41 determines whether the received communication message for relay M2 is to be transmitted to the determining section 412. However, the present invention is not limited to this. A signal receiving section of an ECU may transmit every received communication message for relay to a determining section. In this case, the reliability of a communication message can be determined based on a bus path without requiring determination about the presence or absence of passage of a message ID for relay via a gateway. This improves the design flexibility of the communication system.

According to each of the aforementioned embodiments, mainly the message ID for transmission "0x020" is changed to the message ID for relay "0x021" or "0x022". However, the present invention is not limited to this. As long as a message ID for transmission and a corresponding message ID for relay are defined, a gateway can change the message ID for transmission of any value to the corresponding message ID for relay. If a message ID for transmission is set not to be changed to a message ID for relay, the message ID for transmission can be used as it is as the message ID for relay. Further, determining whether a message ID for transmission is to be changed to a message ID for relay may be made automatically according to a prescribed condition, for example. If multiple message IDs for relay are associated with a message ID for transmission, a message ID for relay to which the message ID for transmission is to be changed may also be changed automatically according to a prescribed condition, for example. As an example, load on an ECU is used as this condition. In the case of low load on the ECU, a message ID for relay is changed to a message ID necessitating confirmation of a bus path. In the case of heavy load on the ECU, in contrast, a message ID for relay is changed to a message ID not necessitating confirmation of a bus path. This improves the design flexibility of the communication system.

According to each of the aforementioned embodiments, the communication system includes only one gateway 10. However, the present invention is not limited to this. The communication system may include multiple gateways. If multiple gateways are provided, the reliability of a communication message may be determined based on the fact that the communication message has passed one of these gateways or two or more of these gateways. This improves the applicability of the communication system.

According to each of the aforementioned embodiments, a communication message for relay contains the bus information 14 and the message ID for relay 15. However, the present invention is not limited to this. Regarding a communication message transmitted from an ECU having authenticated a gateway and having been authenticated by the gateway mutually, for example, different information helpful in determining the reliability of the communication message such as one indicating that the mutual authentication has been completed may be incorporated into a communication message for relay. This further improves the reliability of the communication message.

According to each of the aforementioned embodiments, the communication system is a system based on the CAN protocol. However, the present invention is not limited to this. As long as a communication message is transferred between multiple buses via a gateway, a communication protocol to be applied in the communication system is not limited to the CAN protocol but it may also be a different communication protocol such as Ethernet (registered trademark) or FlexRay (registered trademark). This improves the applicability of this communication system.

According to each of the aforementioned embodiments, the communication system is mounted on the vehicle 1. However, the present invention is not limited to this. Part of the communication system may be mounted on a target other than a vehicle. In this case, the reliability of a communication message can be determined in the communication system including a vehicle, which improves the applicability of this communication system.

According to each of the aforementioned embodiments, the communication system is mounted on the vehicle 1. However, the present invention is not limited to this. The communication system may be mounted on a machine that is required only to realize transfer of a communication message between multiple buses via a gateway. More specifically, the machine may be a rail car, a ship, a robot, or an industrial machine, rather than a vehicle. Thus, an extended range of applicability of this communication system can be expected.

1 Vehicle
10 Gateway (GW)
11 Signal Receiving section
11A Log Acquiring section
12 Signal Changing section
13 Storage
14 Bus Information
16 Log
17 Log Analyzing section
20 First Bus
21, 22, 31, 32, 41, 42 electronic Control Unit (ECU)
20, 30, 40, 50 Bus
51 On-Board Diagnostic Device (OBD)
52 Data Link Connector (DLC)
53, 54 Communication Device
411 Signal Receiving Section
412 Determining Section
413 Signal Processor
414 Storage
415 Log Analyzing Section
416 Communication Line Information
417 Gateway Information
418 Log
419, 420 Log Acquiring Section
M1, M2 Communication Message

The invention claimed is:

1. A communication system comprising at least one communication device and at least one gateway, wherein
the communication device is connected to communication lines and configured to perform communication using a communication message via the communication lines,
the communication lines are connected to the gateway, and the gateway is configured to relay a communication message between the communication lines,
a communication message input to the gateway from a first communication line out of the communication lines is defined as a first communication message, the gateway is configured to generate a communication message for relay, and the communication message for relay contains first path information and second path information incorporated into the first communication message, the first path information indicating the first communication line as bus path information of the first communication line, the second path information indicating the fact that the first communication message has been input to the gateway,
the gateway is further configured to transfer the communication message for relay which includes the first path information and the second path information to at least one communication line different from the first communication line,
the communication device is configured to determine the reliability of the received communication message based on the first path information and the second path information in the received communication message,
the communication device is configured to verify the received communication message based on a path along which this communication message has passed such that the reliability of the received communication message is determined in real time and to further determine appropriateness of the bus path information contained in the first path information by using the second path information of the received communication message, and the communication message for relay includes information indicating whether the communication device receiving the communication message needs to determine the reliability of the received communication message based on the first path information and the second path information.

2. The communication system according to claim 1, wherein communication line information corresponding to the first path information about each of the communication lines is defined for the communication device, and the communication device is configured to determine the reliability of the received communication message based on whether the first path information in the received communication message corresponds to the defined communication line information.

3. The communication system according to claim 1, wherein gateway information corresponding to the second path information about the gateway is defined for the communication device, and the communication device is configured to determine the reliability of the received communication message based on whether the second path information in the received communication message corresponds to the defined gateway information.

4. The communication system according to claim 1, wherein the communication message is configured as a protocol of a controller area network.

5. The communication system according to claim 4, wherein the gateway is configured to incorporate the first path information into a data field of a communication message defined by the protocol, and the communication device is configured to acquire the first path information from the data field of the communication message.

6. The communication system according to claim 4, wherein the gateway is configured to change a message ID of a communication message defined by the protocol to a message ID containing the second path information, and the communication device is configured to acquire the second path information from the message ID after the change in the communication message.

7. The communication system according to claim 6, wherein the communication message has an extended format, and the message ID is a result of change of part of the message ID corresponding to an extended ID area defined by the extended format.

8. The communication system according to claim 1, wherein the gateway stores, as log data, information about a communication message input from the first communication line and the first path information, and the communication device stores, as log data, information about the received communication message, and the first path information and the second path information in the received communication message.

9. The communication system according to claim 8, configured to analyze the log data at regular intervals according to a predetermined rule, the communication system further being configured to replace the log data by a result obtained by the analysis.

10. The communication system according to claim 8, wherein the communication device is configured to acquire the log data stored in the gateway, and the communication device is further configured to evaluate the reliability of a communication message by comparing the acquired log data and the log data stored in the communication device.

11. A communication method for use in a communication system, wherein the communication system includes at least one communication device and at least one gateway, the communication device is connected to communication lines and makes communication using a communication message via the communication lines, the communication lines are connected to the gateway, the gateway relays a communication message between the communication lines, a communication message input to the gateway from a first communication line out of the communication lines is defined as a first communication message, the communication method comprising:

generating a communication message for relay via the gateway, the communication message for relay containing first path information and second path information incorporated into the first communication message, the first path information indicating the first communication line as bus path information of the first communication line, the second path information indicating the fact that the first communication message has been input to the gateway;

transferring the generated communication message for relay from the gateway which includes the first path information and the second path information to at least one communication line different from the first communication line;

making a communication device having received the communication message for relay determine the reliability of the received communication message based on the first path information and the second path information in the received communication message based upon information, indicating whether the communication device receiving the communication message needs to determine the reliability of the received communication message based on the first path information and the second path information, included in the communication message for relay;

making the communication device having received the communication message for relay verify the received communication message based on a path along which this communication message has passed such that the reliability of the received communication message is determined in real time; and making the communication device having received the communication message for relay further determine appropriateness of the bus path information contained in the first path information by using the second path information of the received communication message.

* * * * *